A. E. TRENTOWSKY.
EGG BASKET.
APPLICATION FILED FEB. 8, 1913.
1,125,213.
Patented Jan. 19, 1915.
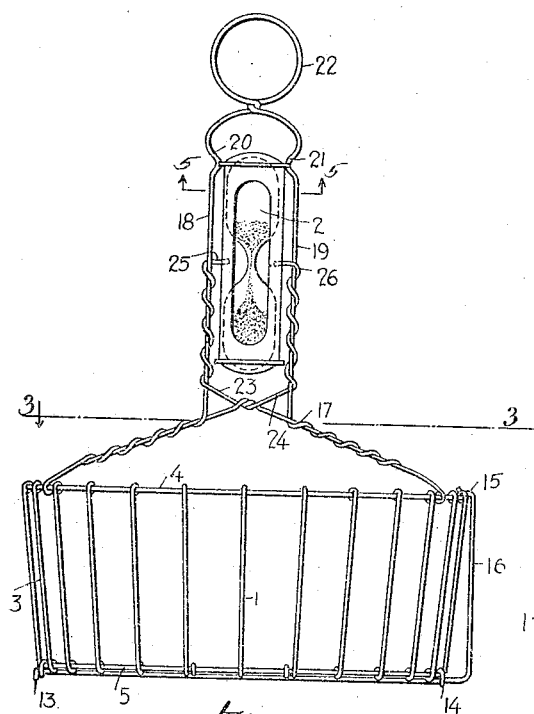
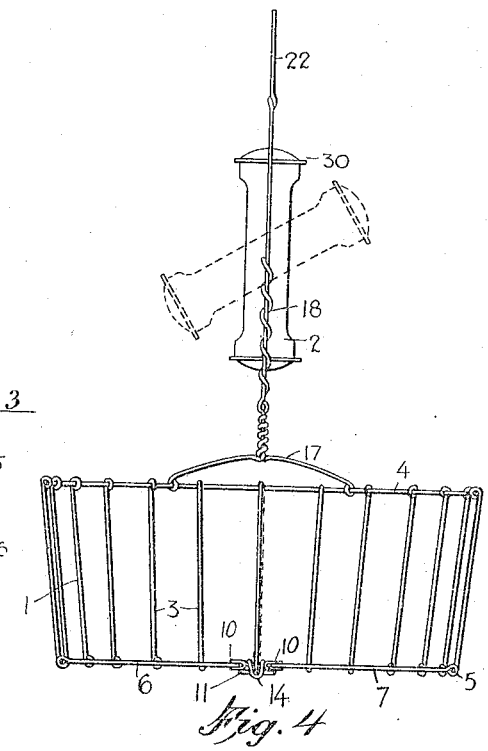
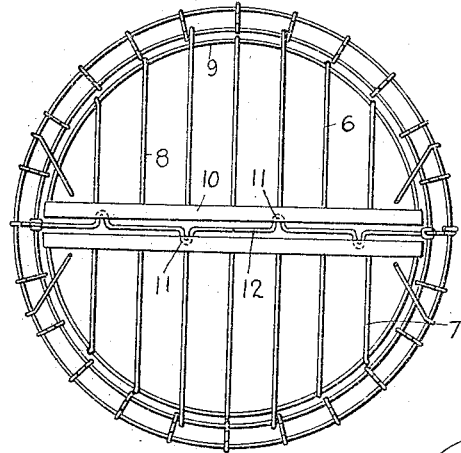
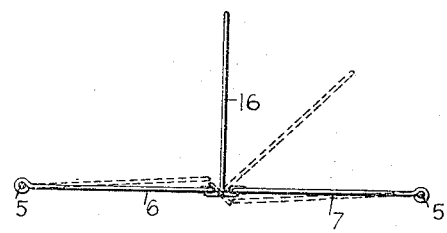
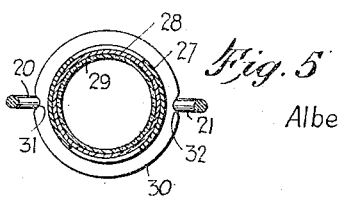
WITNESSES
F. D. Swett
A. L. Kitchin
INVENTOR
Albert E. Trentowsky
BY
ATTORNEYS

UNITED STATES PATENT OFFICE.

ALBERT EDWIN TRENTOWSKY, OF ST. JOHN, NEW BRUNSWICK, CANADA.

EGG-BASKET.

1,125,213.  Specification of Letters Patent.  Patented Jan. 19, 1915.

Application filed February 8, 1913. Serial No. 747,100.

*To all whom it may concern:*

Be it known that I, ALBERT E. TRENTOWSKY, a subject of the King of Great Britain, and a resident of St. John, in the Province of New Brunswick and Dominion of Canada, have invented a new and Improved Egg-Basket, of which the following is a full, clear, and exact description.

This invention relates to improvements in cooking utensils, and particularly to an improved basket for boiling eggs and to means for correctly timing the cooking operation.

The object in view is to provide an improved basket structure for holding eggs or other articles to be cooked, in connection with the timing device, which may be caused to indicate any desired time so that the eggs or other articles may be properly cooked.

Another object of the invention is to provide an improved basket designed to be used in boiling eggs, wherein the eggs may be easily removed by reason of the special construction of the bottom, which is formed so as to open downwardly and allow the eggs to move out by gravity, or rather allow the basket to be moved upwardly while the eggs remain substantially stationary.

In carrying out the objects of the invention, a basket of substantially any suitable shape and size may be provided, formed with a bottom preferably divided into parts and each part hinged to the side walls of the basket. The bottom is supported in a locked or correct position for acting as a bottom by a suitable pivotally mounted catch member or bar which engages the parts of the bottom and prevents any movement thereof until the bar or catch member is turned, whereupon the parts of the bottom may be swung downwardly for discharging the eggs, or any other article in the basket. Extending upwardly from the top of the basket is a handle structure which is preferably formed with a pair of journal members and a pair of spring loops. The journal members are designed to pivotally support the housing of a timer formed preferably in the shape of an hour glass, and the loops are designed to snap into certain notches in the housing of the hour glass so as to normally prevent independent movement thereof.

A practical embodiment of the invention is represented in the accompanying drawings forming a part of this specification, in which similar characters of reference indicate corresponding parts in all the views.

Figure 1 is a side view of a basket and timing structure embodying the invention; Fig. 2 is a section of the structure shown in Fig. 1; Fig. 3 is a section through Fig. 1 approximately on the line 3—3; Fig. 4 is a detail fragmentary view of a bottom and catch handle or lever associated therewith; and Fig. 5 is an enlarged detail sectional view through Fig. 1 on the line 5—5.

Referring to the accompanying drawings by numerals, 1 indicates the basket as a whole, and 2 indicates the timer or timing device as a whole, mounted in the upper part of the basket structure so as to allow the proper timing of any article being cooked in the basket.

The entire device is adapted especially for boiling eggs, though other articles could be boiled in the basket without departing from the spirit of the invention.

In use the eggs are placed in the basket and the body of the basket submerged in the boiling water, but not the timing device 2.

The basket 1 is provided with a side wall 3, formed of a plurality of vertical bars connected with the upper rim 4 and a lower rim 5. These rims and bars are preferably made from wire, but may be made from other material, without departing from the spirit of the invention.

The bottom of the basket 1 is made in parts 6 and 7, each of which is formed of bars 8, a rim 9, and a strip 10 designed to engage the extensions or projections 11 of a locking bar 12. Some of the bars 8 are formed longer than the main bars and are caused to be looped loosely over the bottom rim 5 of the side 3 so that the respective parts 6 and 7 may be swung back and forth. The bar 12 is journaled in loops 13 and 14 and is adapted to have the extensions 11 project beneath the strips 10 when it is desired to have the bottom close so as to support the eggs preparatory to placing the basket in a receptacle containing boiling water, and also while transporting the eggs from one place to the other. The bar 12 is provided at one end with a handle 16 having at its end a catch 15 for engaging the rim 4 of the basket to hold the said bar in operative position.

When it is desired to remove the eggs from the basket 1, the basket is placed upon a dish or other article, where it is desired to deposit the eggs, and the catch 15 of the handle or lever 16 is disengaged from the rim 4 and the lever moved pivotally so as to move bar 12 for substantially a quarter of a turn. This will cause the projections 11 to move from beneath strips 10. After this has been done the basket may be raised vertically and the eggs will remain substantially where they are placed, while the basket and parts 6 and 7 of the bottom will move gradually upwardly away from the eggs. In this way the entire basket full of eggs may be removed from the basket almost instantly.

A handle structure 17 is connected with the upper rim 4, which handle structure is preferably formed of wire. Two of the wires of the handle 17 extend upwardly and form upstanding members 18 and 19, bent into loops 20 and 21. From the loops 20 and 21 the members 18 and 19 project upwardly and are formed into an eyelet 22, designed to be grasped by the hand when moving the basket from one place to the other.

The members 18 and 19 have been described as separating members merely for the purpose of more clearly setting forth the structure, but it will be evident that the same may be made out of one piece, as shown in Fig. 1, or separate pieces, as desired, without departing from the spirit of the invention.

Extending upwardly from the handle 17 are wires 23 and 24 which are preferably inclined or twisted about the wires or upstanding members 18 and 19, and finally caused to extend toward each other intermediate the length of the members 18 and 19 for providing journal members 25 and 26 projecting into the metallic casing 27 of the timing device 2. The timing device 2 is provided with a metallic casing 27 for protecting the same and is also formed with a mica covering 28 and an hour glass structure 29. The hour glass structure 29 is formed in the usual manner and may be made of any desired size so as to measure any length of time, as for instance one minute, two minutes, five minutes, or any fraction thereof.

Near each end of the casing 27 is formed a ring 30 provided with notches 31 and 32, into which the bowed portions 20 and 21 are caused to snap for preventing an independent movement of the timer. It will be evident that the bowed portions 20 and 21 are adapted to engage only one set of notches 31 and 32 at a time.

Having thus described my invention I claim as new and desire to secure by Letters Patent:—

1. A basket comprising a body having a bottom formed of two sections hinged to the sides of the body, a bar mounted to rock and extending across the body below the bottom and provided with oppositely extending projections engaging the sections of the bottom and means for locking said bar in position.

2. A basket, comprising a body having a bottom formed of two sections hinged to the sides of the body and a rocking bar extending across the body below the bottom thereof and provided with oppositely extending projections extending beneath the sections of the bottom, said bar being provided at one end with a handle having a catch at its end for engaging the upper edge of the said body.

In testimony whereof I have signed my name to this specification in the presence of two subscribing witnesses.

ALBERT EDWIN TRENTOWSKY.

Witnesses:
  I. B. RATHBURN,
  LEWIS C. THOMPSON.

Copies of this patent may be obtained for five cents each, by addressing the "Commissioner of Patents, Washington, D. C."